(12) United States Patent  
Crorey

(10) Patent No.: US 6,386,354 B1  
(45) Date of Patent: May 14, 2002

(54) HARMONIC LIFT AND TRANSFER SYSTEM

(75) Inventor: David J. Crorey, Clinton Township, MI (US)

(73) Assignee: Norgren Automotive, Inc., Mt. Clemens, MI (US)

( * ) Notice: Subject to any disclaimer, the term of this patent is extended or adjusted under 35 U.S.C. 154(b) by 0 days.

(21) Appl. No.: 09/519,554

(22) Filed: Mar. 6, 2000

Related U.S. Application Data

(60) Provisional application No. 60/123,331, filed on Mar. 8, 1999.

(51) Int. Cl.[7] .............................................. B65G 25/00
(52) U.S. Cl. .............................. 198/774.3; 198/750.14; 198/468.6
(58) Field of Search ........................... 198/774.3, 468.3, 198/750.14

(56) References Cited

U.S. PATENT DOCUMENTS

| | | | |
|---|---|---|---|
| 2,804,962 A | 9/1957 | Sherman | 198/346.2 |
| 4,394,897 A | 7/1983 | Brems | 198/345 |
| 4,646,915 A | 3/1987 | Ohtaki et al. | 198/345 |
| 5,177,862 A | 1/1993 | Speece | 29/824 |
| 5,203,445 A * | 4/1993 | Shiraiwa | 198/464.3 |
| 5,259,494 A | 11/1993 | Hirose | 198/345.3 |
| 5,320,208 A | 6/1994 | Mason | 198/346.2 |
| 5,449,062 A * | 9/1995 | McTaggart | 198/774.3 |
| 5,524,748 A * | 6/1996 | McTaggart | 198/774.3 |
| 5,653,329 A * | 8/1997 | McTaggart | 198/774.3 X |
| 5,738,203 A | 4/1998 | Crorey | 198/463.3 |

* cited by examiner

Primary Examiner—Stephen T. Gordon  
Assistant Examiner—Lori L Coletta  
(74) Attorney, Agent, or Firm—Young & Basile, P.C.

(57) ABSTRACT

An apparatus for lifting and carrying articles having a support frame and carriage for transferring an article. The apparatus includes at least one first drive for converting rotational movement of a crank member into harmonic linear motion for lifting and lowering the carriage between a first position and a second position along a first path of travel. A second drive moves the carriage between a first position and a second position along a second path of travel.

20 Claims, 4 Drawing Sheets

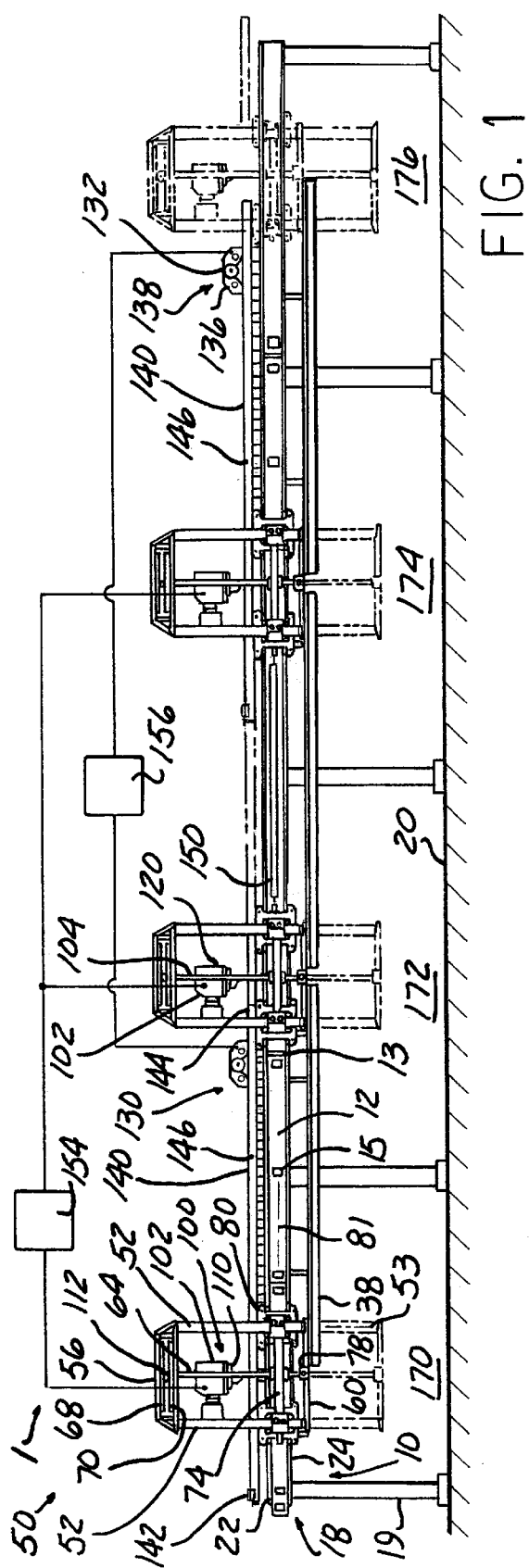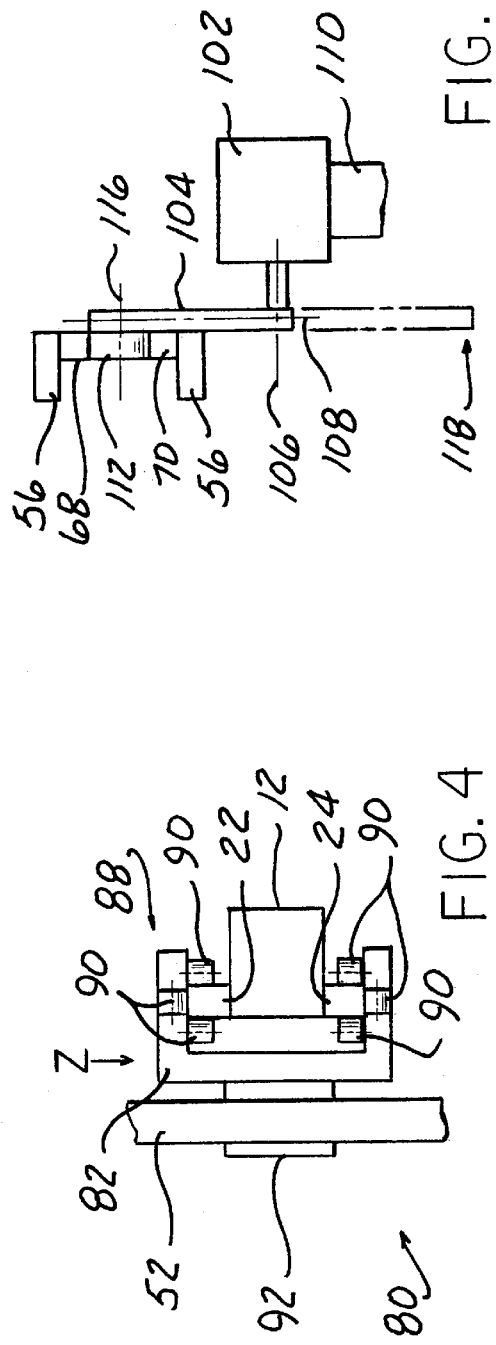

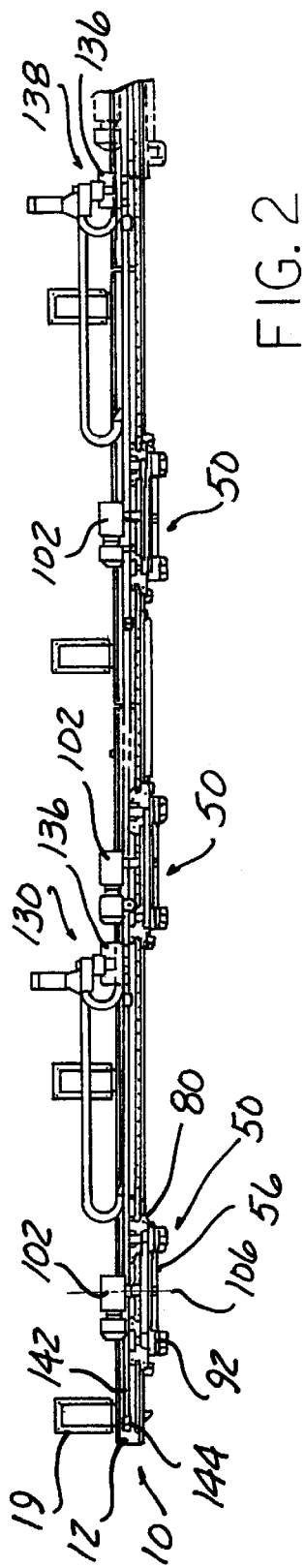
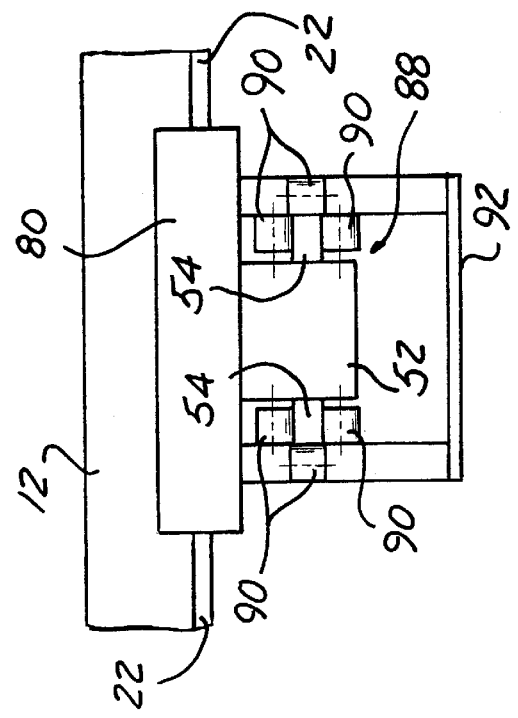
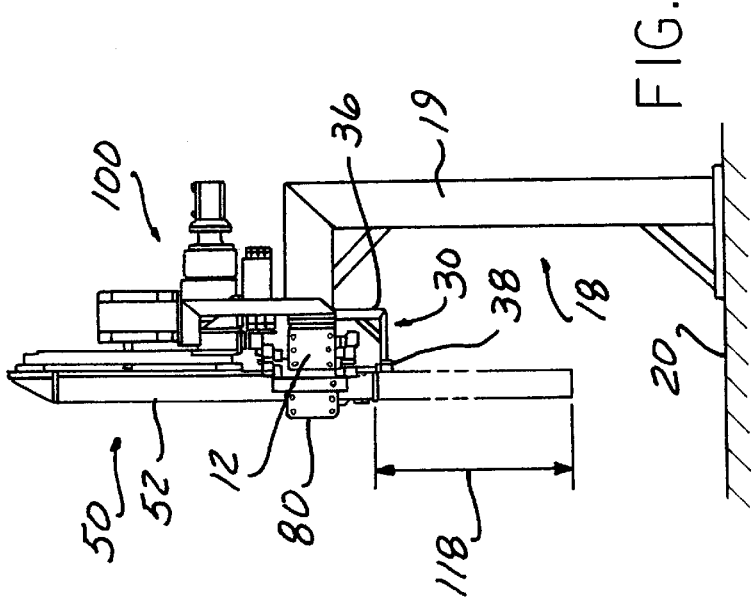

HARMONIC LIFT AND TRANSFER SYSTEM

This application claims the benefit of U.S. Provisional Application No. 60/123,331 filed Mar. 8, 1999.

FIELD OF THE INVENTION

The present invention relates to a lift and carry transfer apparatus and, more particularly, to a lift and carry apparatus that converts rotational movement of a crank member into harmonic linear motion for lowering and lifting an article transport carriage in conjunction with a carry device for moving the carriage between workstations.

BACKGROUND OF THE INVENTION

Multiple station lift and carry transfer devices are generally known. Such devices either raise or lower an article or workpiece to an area where additional work is conducted on the workpiece and then transferred to a distant station for further processing. U.S. Pat. Nos. 2,804,962; 4,394,897; and 5,177,862 disclose such known configurations.

Prior devices suffer from inefficiencies in the type of vertical movement required of the platform or apparatus supporting the workpiece. When such prior devices move to or from a rest position, either raised or lowered, the article transfer apparatus must move slowly and cautiously when approaching and exiting the raised and lowered rest positions. Typically, the weight and load of the article and transfer apparatus does not allow for quick maneuvering, especially when the article transfer apparatus must be accurately aligned with corresponding industrial processing equipment. Any movement of the article transfer apparatus occurring between and beyond the stationary rest position should occur as rapidly as possible in order to reduce cycle times and increase the efficiency of the process.

This type of desired motion, i.e. having a slow start and finish with rapid movement there between, can be provided with harmonic motion. Harmonic motion may be described as having a sinusoidal velocity pattern wherein the object starts at a rest position and gradually accelerates to a maximum speed or velocity over a medial portion of the travel distance. Once the object is beyond the medial portion of the travel distance, the object begins to gradually decelerate until the object reaches a stationary position at the end of the travel. The described motion is typically provided by a hydraulic drive or pneumatic drive using a "bleed and feed" type system. These systems are generally complex in design and expensive to maintain thus affecting the efficiency of the apparatus and its associated processes.

Due to the complexity and limits of the lifting and lowering mechanisms of the prior devices, such devices are unable to adapt or vary the position of the workpiece in its lowered position. Prior devices require the workers, robots or other machines, at each individual workstation to be positioned to accommodate the lowered or raised position of the apparatus.

It is further well known in the art to employ conveyor-type mechanisms to transfer or index a workpiece down an assembly line from a first workstation to a second workstation for further manufacturing operations. Prior inventions have included individual drive mechanisms for each article transport platform and single drive mechanisms for moving multiple platforms. For example, U.S. Pat. Nos. 2,804,922; 4,394,897; and 5,177,862 disclose such systems. Prior devices also suffer disadvantages in efficiency and cost due to the complexity of the drive mechanisms. Electrical conductor drive mechanisms, for example, are disclosed in U.S. Pat. No. 5,177,862; or cam linkage drive mechanisms, for example are disclosed in, U.S. Pat. Nos. 2,804,962 and 4,394,897. These drive systems further suffer from shut down of the entire transfer system if the unit powering the drive between stations fails.

Prior art devices similarly have difficulty in converting from the traditional horizontal indexing to the lifting and lowering operation and vice versa. Prior designs require several mechanical operations to disengage the platform from the horizontal drive mechanism to allow engagement of the lifting and lowering mechanism to prevent dropping the article platform. For example, U.S. Pat. No. 5,177,862 discloses several mechanical steps for this operation. These additional operations reduce the cycle time, increase the complexity of the design, and add cost.

Thus, it would be desirable to provide a lift and carry apparatus that is simplistic in design and that will function in the lifting and lowering cycle and in the transferring of an article from a first station to a second station. It is further desirable to provide a lift and carry apparatus where the lifting and lowering mechanism employs harmonic linear motion that can easily be customized to vary the raised or lowered position of each station. It is further desirable to provide a lift and carry apparatus having an auxiliary drive mechanism to carry articles which can be engaged to maintain operations and increase efficiency. It is also desirable to provide a lift and carry apparatus with increased efficiency, lower initial cost and lower maintenance cost.

SUMMARY OF THE INVENTION

The present invention provides at least one article transfer carriage for lifting and lowering an article between a first position and a second position along a first path of travel and carrying the article between a first position and a second position along a transverse second path of travel. The apparatus provides at least one first drive connected to a frame for converting rotational movement of the drive to harmonic linear motion of the carriage along the first path of travel. The second drive is connected to the frame for moving the carriage back and forth along the transverse second path of travel.

The first drive includes a motor to rotate a rotary crank member and a follower attached thereto in discrete, 180° semi-circular rotations defining a 0° position corresponding to the first position and 180° position corresponding to said second position along said first path of travel.

The second drive includes a motor attached to the frame and cooperatively engages a belt connected to the carriage for moving the carriage along the second path of travel.

The apparatus frame includes an elongate rail substantially parallel to the second path of travel and a lower rail portion attached to the elongate rail extending between the first and second positions along the second path of travel and discontinues just prior to the first and second positions along the second path of travel.

The carriage includes an open ended elongate follower guide that cooperatively engages the first drive follower for supporting and moving the carriage along the first path of travel while the carriage is positioned at the first or second position along the second path of travel.

The carriage further includes a lower guide. When the second drive moves the carriage away from the first and second positions along the second path of travel, the lower guide engages the lower rail portion supporting the carriage along the second path of travel. Once the carriage is supported by the lower rail portion, the first drive follower disengages the elongate follower guide and the first drive no longer supports the carriage along the second path of travel. When the carriage is proximate to the second position along the second path of travel, the elongate follower guide engages another first drive having the rotary crank member positioned at 0° and the lower guide disengages the lower rail portion and the carriage is supported by the first drive. The carriage is moved from the first position to the second position and back again along the first path of travel by the first drive and once completed, the second drive moves the carriage from the second position back to the first position along the second path of travel to complete a cycle.

Where two or more carriages are used, the first drive synchronously moves the carriages between the first and second positions along the first path of travel and the second drive synchronously moves the carriages between the first position and the second position along the second path of travel.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a front view of an apparatus according to the invention having a plurality of workstations along a fixed path with a carriage illustrated in solid line in a first or raised position, and illustrated in phantom in a lowered or second position at each workstation;

FIG. 2 is a plan view of the apparatus as shown in FIG. 1;

FIG. 3 is a right side view of the apparatus shown in FIG. 1;

FIG. 4 is a sectional view of the apparatus taken at A—A in FIG. 1;

FIG. 5 is a sectional view of the invention at B—B in FIG. 1;

FIG. 6 is a partial plan view in the direction of arrow Z in FIG. 4;

DESCRIPTION OF THE PREFERRED EMBODIMENT

Figure 7:
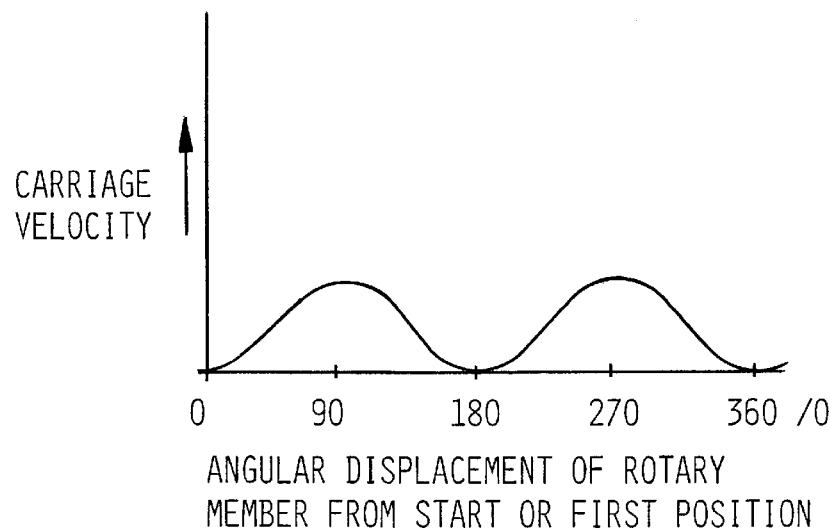
FIG. 7 shows a carriage velocity versus rotary member angular displacement curve for the apparatus according to the present invention.

FIGS. 1–9 illustrate a harmonic lift and transfer apparatus 1 according to the present invention. The apparatus includes a support frame 10 with one or more sectional rails 12 connected end to end at 13 to achieve the desired length of the transfer apparatus 1. Rail 12 is shown in FIG. 1 as a substantially rectangular, hollow rail. Access openings 15 are provided in the rail 12 to connect successive rails to one another, to connect accessories to the rail 12, and to reduce the weight of the rail. Support frame 10 includes support means 18 for positioning rail 12 at the desired height and are provided as columns 19 shown in FIGS. 1 and 3. It is understood that columns 19 could be attached to a floor 20 as shown in FIG. 1 or other structure above rail 12 in effect, suspending the transfer apparatus 1 from a wall or ceiling (not shown). The support frame 10 includes upper and lower substantially square tracks 22 and 24 attached to rail 12 as best seen in FIG. 4. Tracks 22 and 24 extend longitudinally along rail 12 for substantially the entire length of rail 12. Support frame 10 further includes a lower support rail 30 having a discontinuous lower rail portion 38. Lower rail portion 38 is connected to rail 12 by a support 36 as best seen in FIG. 3.

Figure 8:
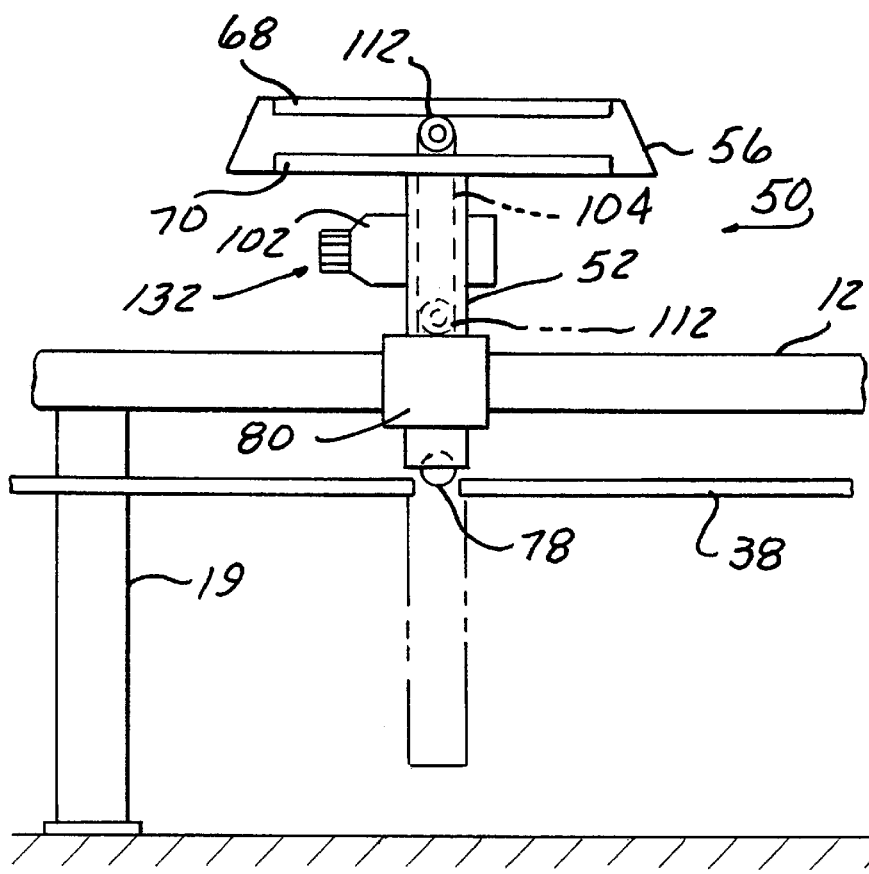
FIG. 8 is a partial front view of an alternate aspect of the invention as shown in FIG. 1.

Apparatus 1 provides an article transfer carriage 50 having at least one elongate side rail 52, an upper cross member 56, a center cross member 74 and lower cross member 60. In FIG. 1, each carriage 50 includes two parallel side rails 52 substantially parallel to a first path or plane of movement 53. Each side rail 52 includes two guide tracks 54 attached to the rail 52. Tracks 54 are substantially square as best seen in FIG. 6. Upper cross member 56 is attached to the elevated ends of side rails 52 and includes an upper elongate follower guide 68 and lower elongate follower guide 70 as best seen in FIGS. 1 and 5. Elongate follower guides 68 and 70 are open ended as shown in FIGS. 1 and 8. Carriage 50 further provides an elongate center shaft 64 and a lower carriage guide 78 attached to lower cross member 60. Lower cross member 60 is attached to the lower ends of rails 52. The center shaft 64 slidingly engages center cross member 74. The carriage 50 further includes an auxiliary vertical brake 76 attached to center cross member 74 and surrounds shaft 64. In the preferred embodiment, brake 76 is a pneumatically operated device commonly known in the industry having sufficient clamping force on shaft 64 to support carriage 50 and any articles supported thereby.

Apparatus 1 further provides at least one carriage guide 80 for supporting the carriage 50 during movement along a second path of travel 81 longitudinally along rail 12 between a first position and a second position and transversely along the first path of travel 53 between the first and second positions. FIG. 1 shows two side rails 52 for each carriage 50 and includes two guides 80, one guide 80 for each rail 52. Carriage guide 80 includes a frame 82 and guide means 88 attached to frame 82 as best seen in FIGS. 1 and 4. The guide means 88 can include three low friction rollers 90 in cooperative engagement with the three exposed surfaces of both tracks 22 and 24 attached to the rail 12 of the support frame 10, and in cooperative engagement with both the tracks 54 attached to the side rail 52 of the carriage assembly 50 as shown in FIGS. 4 and 6 respectively. The carriage guide 80 further includes a cover plate 92. In the preferred embodiment the carriage 50 includes two side rails 52 and two guides 80. Center cross member 74 is attached at opposite ends to each guide 80 as best seen in FIG. 1.

In an alternative embodiment, FIG. 8, carriage 50 provides a single side rail 52 and single guide 80 centered on upper cross member 56. In this embodiment, the center cross member 74 and lower cross member 60, and center shaft 64 are not used and lower carriage guide 78 is attached directly to side rail 52.

The apparatus 1 also includes at least one first drive 100 for transferring carriage 50 between a first or raised position and a second or lowered position along the first path of travel 53. Drive 100 can include a motor 102 for rotating a rotary crank arm 104 about a fixed rotational axis 106 as seen in FIGS. 1 and 5. Motor 102 is supported by an adjustable height base 110 removably attached to rail 12. Preferably, motor 102 is an electric alternating current (AC) motor which may be used in conjunction with limit switches (not shown) positioned on rail 52 to indicate to a first control means 154 that carriage 50 has achieved the first or second position along the first path of travel. Alternatively, motor 102 is an electric servomotor used for precise movement of carriage 50 between the first and second positions.

The first control means 154 and motor 102 rotates the crank arm 104 in discreet, consecutive semi-circular revolutions of approximately 180° at substantially constant speed. A follower 112 is pivotally connected to crank member 104 at an end 116 radially distant from the rotational axis 106 of the crank arm. The follower 112 and crank arm 104 define a stroke length 118 as best seen in FIGS. 3 and 5. Follower 112 cooperatively engages with elongate follower guides 68 and 70 as best seen in FIGS. 1 and 5. Rotary crank arm 104 is removable from both the electric motor 102 and follower 112 allowing a different length crank arm 104 to be used for each drive 100. The stroke length 118 can be altered at each workstation independent of one another. This permits the height of the carriage in the second or lowered position to be adjusted at each workstation by selecting an appropriate crank arm length for that particular station. The motor base 110 is adjusted at each station according to the length of crank 104 at each station so that all carriages 50 are at the same first or raised position when each of the crank arms 104 are at the 0° position.

Figure 9:
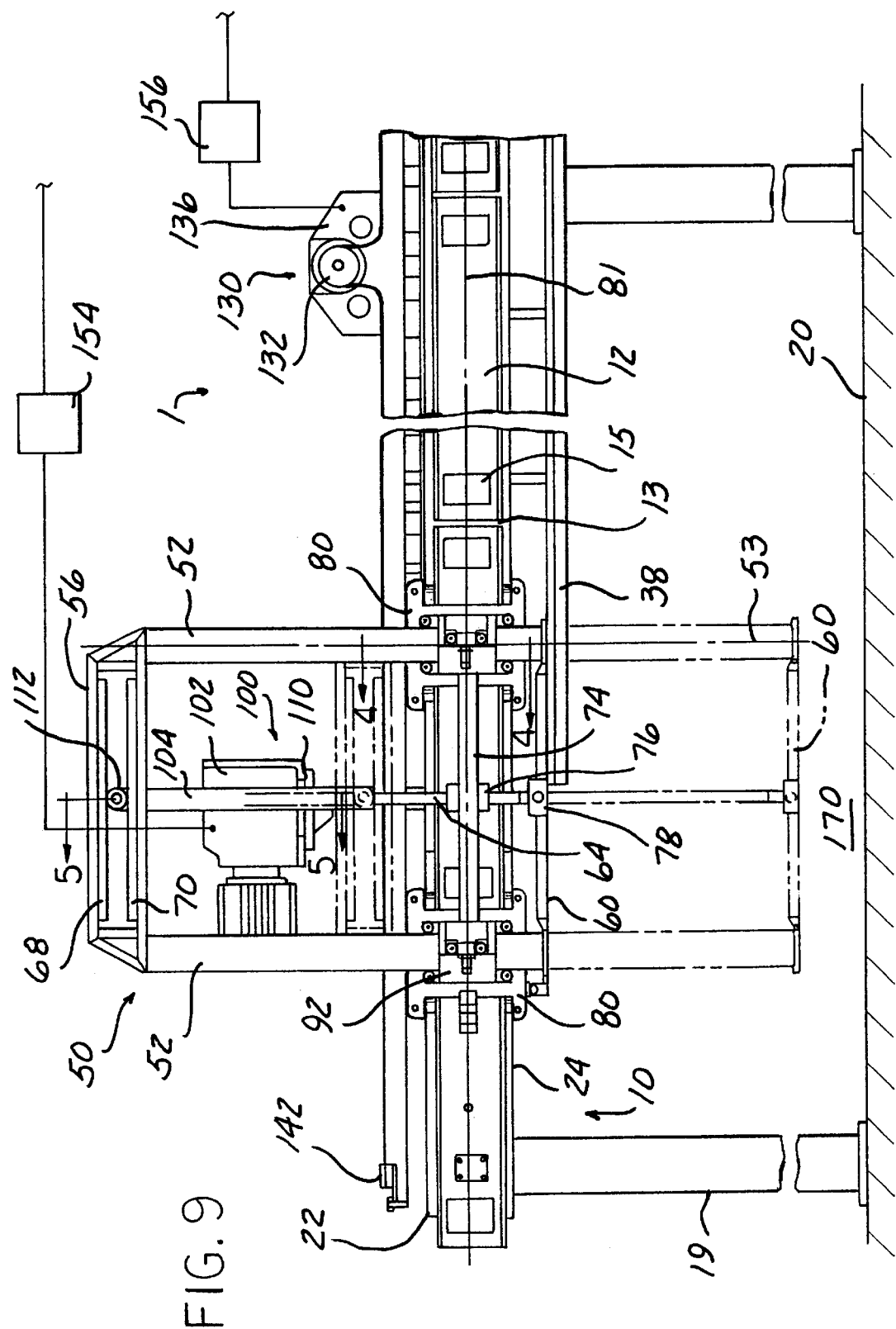
FIG. 9 is a partial enlarged view of FIG. 1.

The apparatus 1 further provides a second drive 130 for transferring the carriage 50 between the first position and the second position along the second path of travel 81 as best seen in FIGS. 1 and 9. Second drive 130 can include a first rotary drive member 132 attached to a drive motor 136 for powering the drive member 132 in rotation about a fixed axis. Drive motor 136 is a reversible motor to rotate the drive member 132 at least 360° at a substantially constant speed. Drive motor 136 is supported by a base (not shown) attached to the rail 12. Second drive 130 can also include in the preferred embodiment a belt 140 attached at opposite ends 142, 144 to an elongate and substantially rigid push bar 146. Belt 140 frictionally engages drive member 132 as best seen in FIG. 1. In the preferred embodiment, belt 140 is placed in longitudinal tension and includes serrations which interlock with protrusions on drive member 132 to eliminate slippage of the belt.

Push bar 146 is connected to one or more carriage guides 80 of one or more transfer carriages 50 as best seen in FIG. 1. In the preferred embodiment, push bar 146 is connected to two transfer carriages 50 through guides 80 at a first workstation 170 and second workstation 172 and drive motor 136 is positioned between the two carriages 50 as best seen in FIG. 1.

In an alternate aspect, the second drive 130 further provides an auxiliary second drive 138 having a second drive member 132 and an auxiliary electric motor 136 shown in FIG. 1. The auxiliary second drive 138 may be positioned between a second pair of carriages 50 positioned at a third workstation 174 and fourth workstation 176 as seen in FIG. 1. In an alternate aspect, the second drive and auxiliary motors 136 are operated by a second control means 156. Second control means 156 provides a clutch to engage and disengage either one of the drive motors 136. Backup or auxiliary drive 138 provides for maximum operation time in the event of a failure in one of the drive means.

In the preferred embodiment, motor 136 is an electric servomotor capable of accurately controlling the rotation of drive member 132 to limit the linear travel of belt assembly 140 and carriage 50. In an alternative embodiment, motor 136 can be an alternating current motor. In the case of an alternating current motor, proximity or limit switches (not shown) can be positioned on rail 12 to signal to the control means 156 when the carriage 50 has achieved the desired position. In response to the appropriate signal, control 156 can halt rotation of motor 136 to stop linear movement of carriage 50.

Although the disclosed second drive 130 has been described as a belt drive system, it should be understood by those skilled in the art that second drive 130 could be a chain driven, rack and pinion-type, pneumatic or hydraulic drive system without departing from the spirit or scope of the present invention.

Referring to FIG. 1, where three or more transfer carriages are required, as shown in FIG. 1, an elongate substantially rigid tie bar 150 is provided to connect additional carriages 50. Tie bar 150 may be attached to opposing guides 80 of successive carriages 50, for example, between station 172 and 174 as best seen in FIG. 1.

For exemplary purposes, FIG. 1 shows three carriages 50 serving four workstations. The second drive 130 preferably includes rotary drive motor 136 and belt 140 attached as previously described to the first and second transfer carriages at stations 170 and 172 through carriage guides 80. The auxiliary second drive 138 may be attached to the third carriage 50 positioned between the third and fourth workstations 174 and 176. Tie bar 150 may be attached at opposite ends to the carriages 50 positioned at the second 172 and third 174 workstations to rigidly connect all three of the carriages 50 to one another for synchronized movement along the second path of travel 81. The second drive 130 could be positioned between and attached to any two carriages 50 and through use of tie bars 150, connect additional carriages 50 at workstations on either or both sides of the second drive 130. Each of the workstations provides a first drive 100 and in connection with first control means 154, provides for synchronous lowering or raising of carriages 50 each with harmonic linear motion.

In operation, the apparatus 1 is used to lift and transfer articles from one workstation to an adjacent workstation, lower and raise the carriage 50 at the adjacent workstation through harmonic linear motion, and index back to the prior workstation to complete a cycle. For exemplary and simplification purposes only, apparatus 1 will be described as including one carriage 50 serving a first workstation 170 and a second workstation 172 along the second path of travel 81.

Apparatus 1 begins a cycle with transfer carriage 50 positioned at a first position along the second path of travel 81, i.e. the first workstation 170, in the first or raised position as shown in solid line in FIG. 1. When carriage 50 is positioned at workstation 170, the lower guide 78 is disengaged from the lower rail portion 38. The carriage 50 is vertically supported by the rotary crank arm 104 positioned at the 0° position through cooperative engagement of follower 112 with the carriage follower guides 68 and 70 as shown in FIGS. 1 and 5.

First control means 154 activates first drive 100 to activate electric motor 102. The motor 102 rotates the rotary crank 104 at a constant velocity in either a clockwise or counter-clockwise direction. For purposes of describing the preferred embodiment, the rotary crank 104 is shown rotating in a counter-clockwise direction in FIG. 1. As seen in FIG. 7, the carriage 50 begins a limited path of travel from a rested or raised position when the rotary crank 104 is at the 0° angular position with respect to an origin or start position. As the crank arm 104 rotates about pivotal axis 106, the carriage 50 gradually accelerates, sinusoidally, to a maximum speed over a medial portion of the limited path of travel. Maximum speed corresponds to the crank arm 104 having a longitudinal axis 108 parallel to the follower guides 68 and 70 at a 90° angle with respect to the raised or first position. As the crank arm 104 continues to rotate counter-clockwise, the follower 112 begins to reciprocate back to the center of the follower guides 68 and 70 thus, gradually decelerating, sinusoidally, the speed of carriage 50. When the carriage 50 reaches the end limit of travel, the carriage 50 achieves an effective second or lowered position and the crank arm 104 has a longitudinal axis 108 generally normal to guides 68 and 70 at a 180° angle with respect to the raised or first position. When in the second position, the rotary crank 104 has a longitudinal axis 108 diametrically opposed to the first position where the crank arm started so that the crank arm 104 has completed a discrete semi-circular revolution of approximately 180°.

In the event a power outage occurs when crank arm 104 is between 0° and 180° or 180° and 360°, and the weight of carriage 50 and any carried article on the carriage tends to involuntarily gravitate towards the 180° or lowered position, a vertical brake 76 may automatically be engaged thereby providing a clamping force on shaft 64 preventing further downward movement of carriage 50.

At the second or lowered position, the center shaft 64 is positioned in the longitudinal plane or path of lower rail 38 portion to prevent unauthorized longitudinal movement of carriage 50 along rail 12 under any circumstances as best seen in FIG. 1.

The first drive 100 is designed for movement of the rotary crank arm 104 in 180° cycles. The crank arm 104 rotates in the same counter-clockwise direction when the crank arm 104 reaches the lowered or second position, as represented by the angular displacement of the crank arm 104 in FIG. 7. Once the crank arm 104 has returned to the vertically upright position, the crank arm 104 stops at 0°.

When carriage 50 reaches the first or raised position as shown in FIG. 1, a second control means 156 activates the second drive 130. Control means 156 engages rotary drive motor 136 or alternately, auxiliary drive motor 136 of auxiliary second drive 138, to begin movement of the article transfer carriage 50 from a first station 170 to a second station 172. Electric motor 136 begins to rotate drive member 132 in a clockwise direction at a substantially constant speed. Through engagement of drive member 132 with belt 140, the belt 140 moves the attached carriage guides 80 and carriage 50, away from the first station 170 and toward the second station 172 in the direction of second path 81 extending longitudinally along rail 12. When carriage 50 has moved a short distance from first station 170, the lower guide 78 rollingly engages the lower rail portion 38 providing vertical support for the carriage 50. When carriage 50 has moved a greater distance from first station 152, follower 112 slidingly disengages from follower guides 68 and 70 of the carriage 50, and the carriage 50 is vertically supported by the lower rail portion 38.

When carriage 50 is in close proximity to the second position along the second path of travel 81, i.e., workstation 172, the follower 112 of a separate first drive 120, positioned at the second workstation, rollingly engages follower guides 68 and 70. The first drive 120 is attached to the rail 12 and has crank 104 prepositioned at 0°. When carriage 50 reaches the second station 172, second control means 156 deactivates the electric motor 136 to stop rotation of drive member 132 and translation of the belt 140. At the second station 172, lower guide 78 is disengaged from the lower rail portion 38, and carriage 50 is again vertically supported by follower 112 and crank arm 104 positioned at 0°. First control means 154 activates the first drive 120 positioned at the second station 172 to rotate the rotary crank arm 104 in a counter-clockwise direction to cycle the carriage 50 from the first or raised position to the second or lowered position and back again in the same harmonic linear manner.

It is understood that in a multicarriage apparatus 1, as shown in FIG. 1, first control means 154 can activate all of the first drives 100 simultaneously for synchronized cycling of all carriages 50 positioned at the various workstations. Likewise, second drive 130 can be activated to move all carriages 50 from one station to another workstation and back again in a synchronized cycle.

When carriage 50 is positioned at the first or raised position at the second position along the second path of travel 81, i.e., second work station 172, second control means 156 activates rotary drive motor 136. Electric motor 136 reverses rotation to a counter-clockwise direction and through engagement with drive member 132, the belt 140 moves attached carriage 50 away from the second station 172 and back toward the first station 170 along rail 12 in the same manner as that of translating from the first station to the second except in the opposite direction. When the carriage 50 reaches the first station 170, the second control means 156 stops electric motor 136 to cease movement of the belt 140 and carriage 50.

Although the apparatus 1 has been described as having one carriage 50 servicing two stations, it is understood that the present invention may include multiple carriages 50, for example, three carriages serving four workstations as shown in FIG. 1, or any other number of carriages as desired for a particular application.

While the apparatus has been described with respect to horizontal and vertical movement, it would be recognized that the present invention encompasses harmonic linear movement along at least one first fixed path and encompasses movement along a second fixed path in any direction by a second drive transverse to the first fixed path. Movement in the first path can occur at one or more locations spaced along the second fixed path. Therefore, the terms horizontal and vertical as used herein are for purposes of illustration and not by way of limitation.

While the invention has been described in connection with what is presently considered to be the most practical and preferred embodiment, it is understood that the invention is not limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as permitted under the law.

What is claimed is:

1. A harmonic lift and transfer apparatus comprising:
   at least one article transfer carriage;
   a frame supporting said carriage for movement along a first predetermined path of travel and a second predetermined path of travel wherein said second predetermined path of travel is transverse to said first predetermined path of travel including an elongate rail, a discontinuous lower rail portion attached to said elongate rail, said lower rail portion extends along said second path of travel and discontinues at said first and said second positions along said second path of travel;
   at least one first drive for converting rotational movement of said first drive into harmonic linear motion of said carriage along said first path of travel between a first position and a second position having a rotary crank member, a motor connected to said elongate rail for rotating said crank member about a fixed rotational axis, and a follower pivotally attached to said crank member radially spaced from said rotational axis; and a second drive for moving said carriage along said second path of travel between a first position and a second position.

2. The apparatus of claim 1 wherein said motor rotates said crank member about said fixed axis of rotation in discrete, semi-circular revolutions of 180° at substantially constant speed, said crank member having a 0° position corresponding to said first position and a 180° position corresponding to said second position along said first path of travel.

3. The apparatus of claim 1 wherein said carriage further comprises a lower guide cooperatively engaging with said discontinuous lower rail, said discontinuous lower rail supporting said carriage between said first and said second positions along said second path of travel.

4. A harmonic lift and transfer apparatus comprising:

at least one article transfer carriage;

a frame supporting said carriage for movement along a first predetermined path of travel and a second predetermined path of travel wherein said second predetermined path of travel is transverse to said first predetermined path of travel including an elongate rail, a discontinuous lower rail portion attached to said elongate rail, said lower rail portion extends along said second path of travel and discontinues at said first and said second positions along said second path of travel;

at least one first drive for converting rotational movement of said first drive into harmonic linear motion of said carriage along said first path of travel between a first position and a second position having an upper cross member having an elongate follower guide, at least one side rail attached to said upper cross member and positioned substantially parallel to said first path of travel, and at least one carriage guide for guiding said carriage along said first and said second paths of travel; and a second drive for moving said carriage along said second path of travel between a first position and a second position.

5. The apparatus of claim 4 wherein said elongate follower guide is open-ended and cooperatively engages with said follower of said first drive such that when said carriage moves away from said first and said second positions along said second path of travel, said follower disengages said elongate follower guide.

6. The apparatus of claim 4 wherein said transfer carriage further comprises:

at least two side rails;

at least two carriage guides, said transfer carriage having a lower cross member positioned between and attached to said side rails; and a center cross member attached to said carriage guides.

7. The apparatus of claim 6 wherein said carriage further comprises:

a center shaft attached at opposite ends to said upper and said lower cross members; and a brake attached to said center cross member, said brake selectively engages said shaft to prevent translation of said carriage along said first path of travel.

8. A harmonic lift and transfer apparatus comprising:

at least one article transfer carriage;

a frame supporting said carriage for movement along a first predetermined path of travel and a second predetermined path of travel wherein said second predetermined path of travel is transverse to said first predetermined path of travel;

at least one first drive for converting rotational movement of said first drive into harmonic linear motion of said carriage along said first path of travel between a first position and a second position; and a second drive for moving said carriage along said second path of travel between a first position and a second position including a first rotary drive member, a drive motor for rotating said rotary drive member, and a belt attached to said carriage wherein said belt cooperatively engages said first rotary drive member for moving said carriage between said first and said second position along said second path of travel.

9. A harmonic lift and transfer apparatus comprising:

at least one article transfer carriage, said carriage having an upper cross member with an elongate follower guide, at least one side rail connected to said upper cross member, at least one carriage guide for guiding said carriage along a first predetermined path of travel and a second predetermined path of travel wherein said second path of travel is transverse to said first path of travel;

a frame for supporting said carriage along said first and said second paths of travel, said frame having an elongate rail substantially parallel to said second path of travel, and a discontinuous lower-rail portion connected to said elongate rail wherein said lower rail portion extends along said second path of travel and discontinues at said first and said second positions along said second path of said travel;

at least one first drive for converting rotary motion of said first drive into harmonic linear motion of said carriage along said first path of travel between a first position and a second position, said first drive having a rotary crank member, a motor connected to said elongate rail for rotating said rotary crank member about a fixed axis of rotation, and a follower pivotally attached to said crank member radially spaced from said axis of rotation; and a second drive for moving said carriage along said second path of travel between a first and a second position, said second drive having a first rotary drive member, a drive motor connected to said elongate rail for rotating said rotary drive member about a fixed axis of rotation, a belt attached to said carriage guide wherein said belt cooperatively engages said rotary drive member for moving said belt and said carriage along said second path of travel.

10. The apparatus of claim 9 wherein said carriage further comprises a lower guide cooperatively engaging with said discontinuous lower rail, said discontinuous lower rail supporting said carriage between said first and said second positions along said second path of travel.

11. The apparatus of claim 9 wherein said transfer carriage further comprises:

at least two side rails;

at least two carriage guides, said carriage having a lower cross member positioned between and connected to said side rails, said lower guide is connected to said lower cross member; and a center cross member attached to said carriage guides.

12. The apparatus of claim 11 wherein said carriage further comprises:
   a center shaft connected to said upper and said lower cross members; and
   a brake attached to said center cross member for selectively engaging said center shaft to prevent movement of said carriage along said first path of travel.

13. The apparatus of claim 9 wherein said carriage guide further comprises:
   a frame;
   means for guiding said carriage along said first path of travel; and
   means for guiding said side rail along said second path of travel.

14. The apparatus of claim 13 wherein said means for guiding said carriage along said first path of travel comprises:
   a plurality of rollers cooperatively engaging with said side rail; and wherein said means for guiding said carriage along said second path of travel comprises:
   a plurality of rollers cooperatively engaged with said elongate rail.

15. The apparatus of claim 9 wherein said motor of said first drive provides rotation of said rotary crank member about said axis of rotation in discrete semi-circular revolutions of 180° at substantially constant speed, said crank member having a 0° position corresponding to said first position on said first path of travel and said crank member having a 180° position corresponding to said second position along said first path of travel.

16. The apparatus of claim 9 wherein said first drive further comprises:
   a base positioned between said motor of said first drive and said elongate rail to selectively vary the height of said fixed rotational axis of said first drive from said elongate rail.

17. The apparatus of claim 9 wherein the second drive further comprises:
   a substantially rigid push bar attached to said carriage guide, said belt is connected at opposite ends to said push bar.

18. The apparatus of claim 9 wherein said second drive further comprises:
   a second rotary drive member;
   an auxiliary motor for rotating said second rotary drive member; and
   means for controlling said second drive for selectively activating said second drive motor and said auxiliary drive motor such that one of said second drive motors operates to translate said carriage along said second path of travel at any one time.

19. The transfer apparatus of claim 9 wherein said apparatus comprises:
   at least a first and a second transfer carriage;
   means for controlling said first drive wherein said first control means provides synchronous movement of said first and said second carriages between said first and said second positions along said first path of travel; and
   means for controlling said second drive wherein said second means provides synchronous movement of said first and said second carriages between said first and said second positions along said second path of travel.

20. The transfer apparatus of claim 9 wherein said apparatus comprises:
   at least a first, a second and a third transfer carriage wherein said second drive belt is connected to said carriage guides of said first and said second carriages;
   a substantially rigid tie bar attached at opposite ends to said carriage guides of said second and said third carriages;
   means for controlling said first drive wherein said first control means provides synchronous movement of said first, said second and said third carriage between said first and said second positions along said first path of travel; and
   means for controlling said second drive wherein said second control means provides synchronous movement of said first, said second and said third carriages between said first and second positions along said second path of travel.

* * * * *